United States Patent [19]

Ledwell, Jr.

[11] 4,037,565

[45] July 26, 1977

[54] SYSTEM FOR HARVESTING AND TRANSPORTING CHICKENS

[76] Inventor: Lloy W. Ledwell, Jr., Box 1106, Texarkana, Tex. 75501

[21] Appl. No.: 634,404

[22] Filed: Nov. 24, 1975

Related U.S. Application Data

[63] Continuation-in-part of Ser. No. 492,348, July 26, 1974, Pat. No. 3,921,588.

[51] Int. Cl.² ............................................. A01K 29/00
[52] U.S. Cl. .................................................... 119/82
[58] Field of Search ................................... 119/82, 17

[56] References Cited

U.S. PATENT DOCUMENTS

| 3,672,335 | 6/1972 | Sanders | 119/82 |
|---|---|---|---|
| 3,722,477 | 3/1973 | Weddy et al. | 119/82 |
| 3,785,349 | 1/1974 | Christopher | 119/82 |
| 3,796,189 | 3/1974 | Blondeel | 119/17 |
| 3,805,743 | 4/1974 | Crowder | 119/82 |

*Primary Examiner*—Hugh R. Chamblee
*Attorney, Agent, or Firm*—William R. Laney

[57] ABSTRACT

A system for harvesting and transporting chickens comprising a self-propelled vehicle having finger-carrying chicken harvesting means at one side thereof for picking up and elevating chickens as the vehicle advances; a first conveyor carried on said vehicle for receiving chickens from said chicken harvesting means and moving them to a second side of said vehicle; an elongated telescoping conveyor having one end positioned under one end of said first conveyor at said second side of said vehicle; swingable boom means pivotally mounted on said vehicle and including a flexible suspension member connected to a medial portion of said elongated telescoping conveyor for swingably supporting said telescoping conveyor on said vehicle; and a coop structure adapted for connection to the end of said telescoping conveyor which is remote from said vehicle. The coop structure is multi-tiered and includes a plurality of collapsible, removable floors, and means for controlling the sequential collapse of the floors to discharge chickens in sequence from the several tiers through the bottom of the coop structure. In a preferred embodiment, the system further includes a second self-propelled vehicle having a conveyor thereon, and means on the vehicle for supporting at least one of the coop structures over the conveyor for discharging chickens from the bottom of the coop structure onto the conveyor.

17 Claims, 12 Drawing Figures

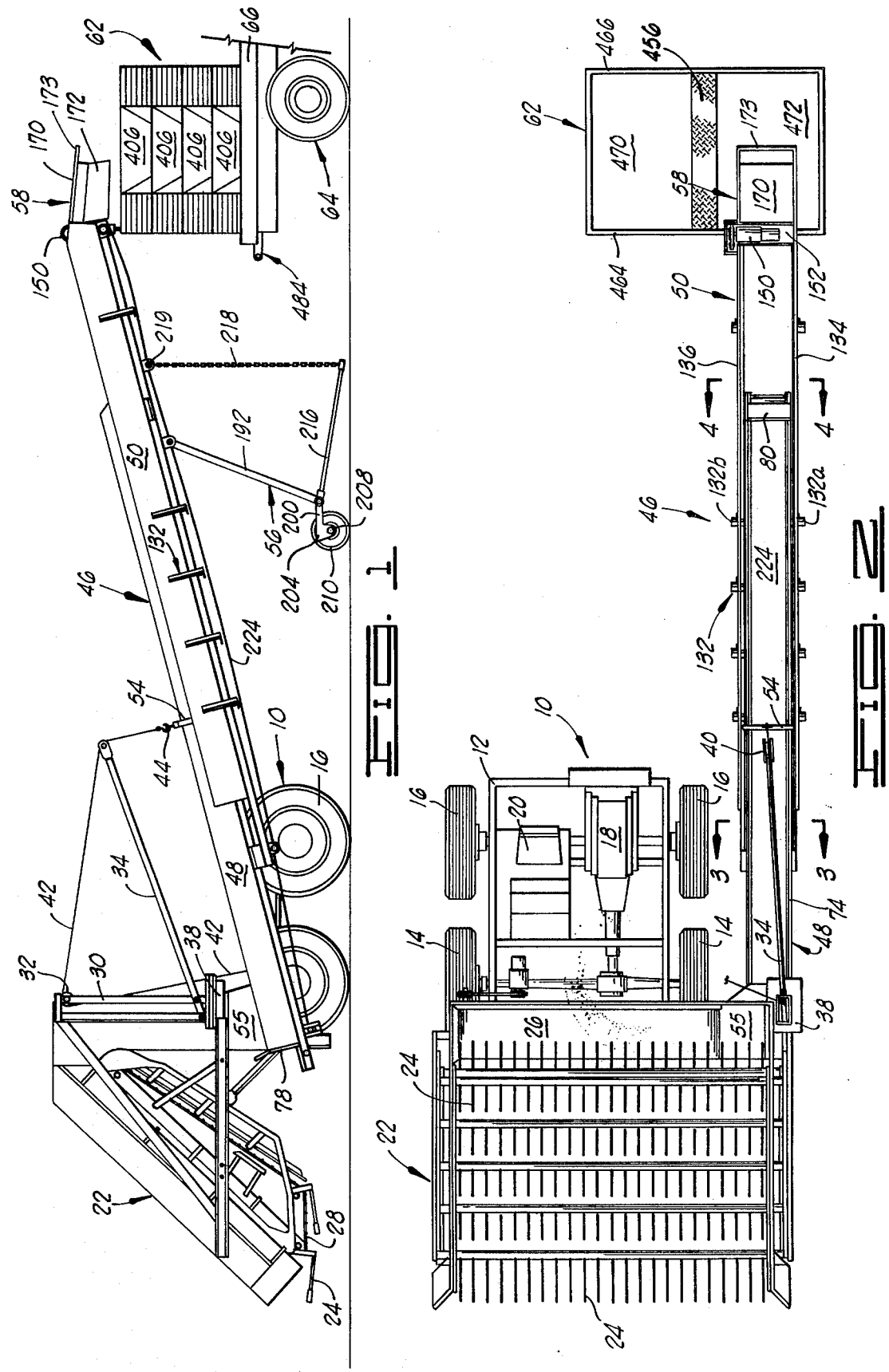

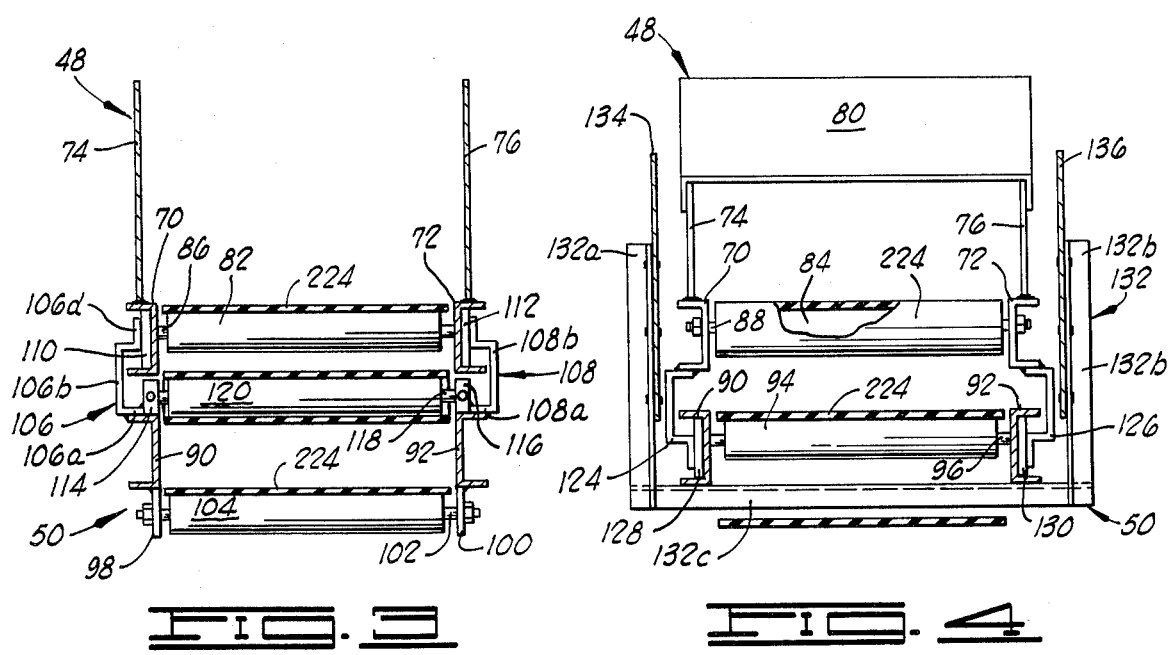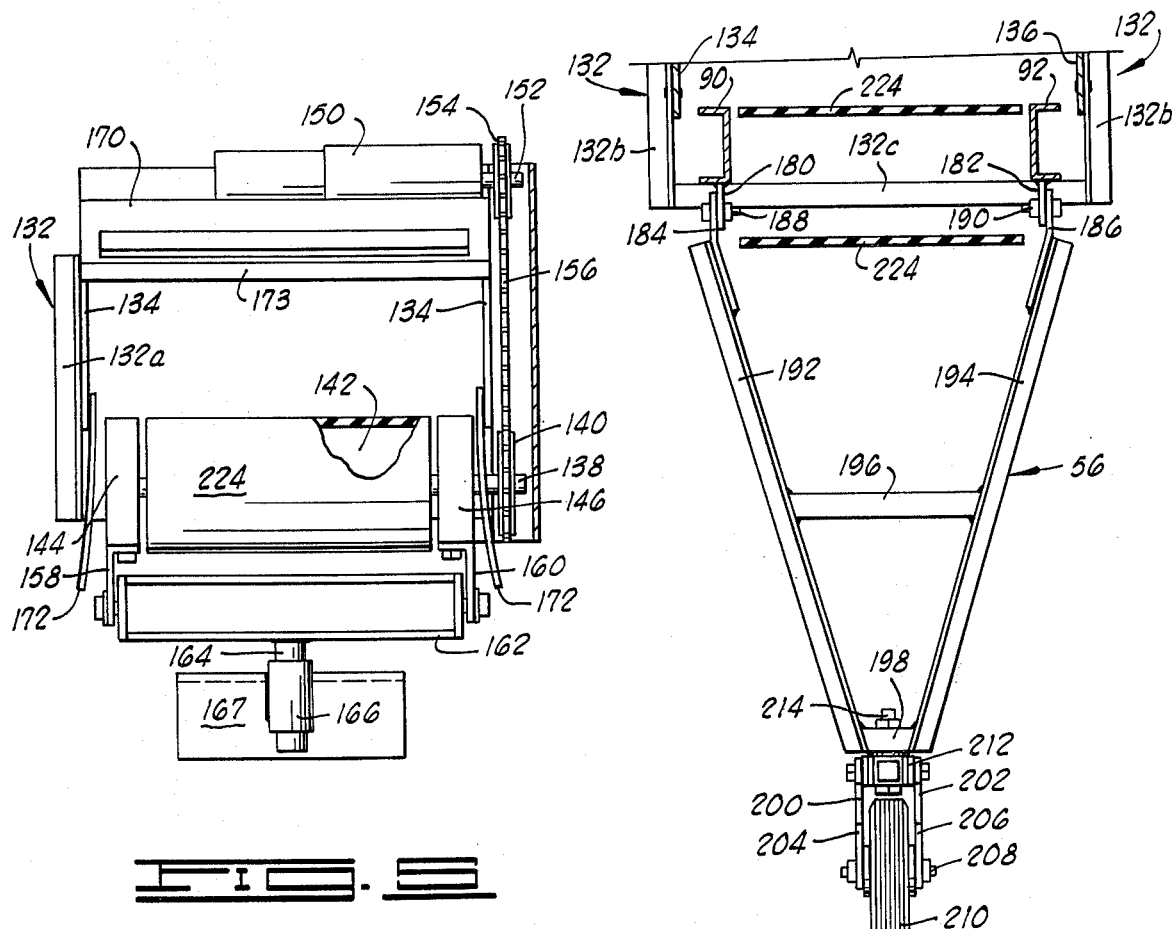

SYSTEM FOR HARVESTING AND TRANSPORTING CHICKENS

RELATED APPLICATION

This application is a continuation-in-part of my copending U.S. Application Ser. No. 492,348, filed July 26, 1974, now U.S. Pat. No. 3,921,588, and entitled "Method and Apparatus for Harvesting Domestic Fowl".

BACKGROUND OF THE INVENTION

1. Field of the Invention

This invention relates to systems for automatically harvesting, cooping and transporting chickens.

2. Brief Description of the Prior Art

In the poultry industry, it is necessary to gather or harvest chickens from very large poultry houses in which the chickens are raised, for the purpose of cooping them and shipping them to a processing plant where the chickens are decapitated, plucked and prepared for the consumer market. An important concern in this harvesting and transporting operation is the speed and cost of gathering together the chickens and placing them in trucks. Previously, this has been accomplished primarily by manual means with unskilled labor and preferably, in most instances, working at night when the chickens are more easily harvested than in the day. The increasing cost and difficulty of obtaining reliable, productive labor for this task has, in part, led to the development of an automatic chicken harvesting apparatus which I have depicted and described in my copending application Ser. No. 492,348 filed July 26, 1974 and entitled "Method and Apparatus for Harvesting Domestic Fowl".

As was pointed out in my copending patent application, another important consideration in the harvesting and transporting of chickens is the desideratum of handling the chickens in a manner which will avoid bruising the chickens in any way, since bruising of the fowl results in a curtailment of the price which the producer can expect to obtain after the chickens arrive at the processing plant and are inspected. Accordingly, it is continuing quest of the poultry industry to devise improved methods for both harvesting and transporting chickens so as to handle the fowl in a manner which does not cause them to flutter violently about against various rigid confining structures, or to be treated roughly in the cooping process, with the result that the flesh is bruised or the chicken injured. It is also, of course, desirable to accomplish as much as possible of the harvesting, cooping and transporting operation, from the point of harvesting to the point of processing in the processing plant, by completely automatic means, and without the requirement for manual labor for loading and unloading the chickens.

BRIEF DESCRIPTION OF THE PRESENT INVENTION

The present invention provides an integrated system which can be utilized to gather up numbers of chickens from the interior of a large commercial poultry house in a gentle, yet expeditious manner, and move these chickens to a selected location where they are cooped for transport in multi-tiered coop assemblies which can be loaded semi-automatically. The coop assemblies are transported on a specially constructed vehicle to a processing plant where the coop assemblies and transporting vehicles can be cooperatively actuated to discharge the chickens gently onto one of the processing conveyors of the processing plant. At all points in this system, the chickens are handled without excessive agitation, and without engendering trauma, so that the fowl arrive at the processing plant in overall good physical condition.

Broadly described, the harvesting and transporting system of the invention comprises a self-propelled vehicle having finger-carrying chicken harvesting means at one side thereof for picking up and elevating chickens from floor or ground level as the vehicle advances. A first conveyor is carried on the vehicle for receiving the chickens from the finger-carrying harvesting means, and moving them to a second side of the vehicle. The vehicle, finger-carrying means and first conveyor, as thus described, constitute a chicken harvesting apparatus of the sort illustrated and described in my copending application Ser. No. 492,348, of which the present application is a continuation-in-part, and which is incorporated herein by reference.

A boom is swingably mounted on the vehicle, and a flexible member is reaved through a sheave or pulley carried at the outer end of the boom and is connected at its end to a medial portion of an elongated telescoping conveyor. The telescoping conveyor has one of its ends connected to the vehicle at a location beneath the discharge end of the first-mentioned conveyor for receiving chickens discharged from the first-mentioned conveyor.

The opposite end of the telescoping conveyor is adapted for pivotal connection to a multi-tiered coop assembly to facilitate discharge of chickens onto the several tiers of the coop assembly. The coop assembly preferably includes a plurality of selectively collapsible or removable floors, and means for controlling the sequential collapse of the floors to discharge chickens in sequence from the several tiers to the bottom of the coop structure.

In a preferred embodiment of the invention, this system further includes on the vehicle used for transporting the coop assemblies from the point of loading thereof, a longitudinal, or fore-and-aft conveyor positioned beneath the center of the coop assemblies, and means on the transporting vehicle on opposite sides of the conveyor for supporting at least one of the coop assemblies over the conveyor in a position to discharge chickens onto the conveyor from the bottom of the coop structure.

Within the system for harvesting and transporting chickens as thus described, several novel and highly useful subassemblies are included, including that of the elongated telescoping conveyor used to move the chickens from the harvesting vehicle into the coop assemblies, and that of the coop assemblies, per se. These subassemblies, forming a part of the overall system, function, because of their unique structure and manner of usage, to enable chickens to be transported to the processing plant with substantially reduced bruising, or downgrading as a result of injury or mishandling.

From the foregoing description of the invention, it will be perceived that an important object of the present invention is to provide a composite, efficient and semi-automatic system for harvesting and transporting chickens from a large commercial poultry house to a processing plant.

Another important object of the invention is to provide a system for harvesting or gathering poultry from ground level at the location where the poultry are produced, cooping the poultry compactly, yet without bruising or injury, and transporting the poultry to the point of discharge at a poultry processing plant with the minimum of human intervention, and a reduction in the requirement for manual labor in the harvesting and cooping procedures.

Additional objects and advantages of the invention will become apparent as the following detailed description of preferred embodiments of the invention is read in conjuction with the accompanying drawings which illustrate such preferred embodiments.

GENERAL DESCRIPTION OF THE DRAWINGS

FIG. 1 is a side elevation view illustrating the system of the invention as it appears when viewed from one side thereof.

FIG. 2 is a plan view illustrating the system of the invention as it is viewed from above.

FIG. 3 is a sectional view taken along line 3—3 of FIG. 2.

FIG. 4 is a sectional view taken along line 4—4 of FIG. 2.

FIG. 7 is a view, partially in elevation and partially in section, showing the steering wheel subassembly of the invention, and a portion of the telescoping conveyor to which it is connected.

FIG. 8 is a side elevation view of one of the coop assemblies utilized in the system of the invention, with the chicken-supporting floors removed from the coop assembly.

DETAILED DESCRIPTION OF A PREFERRED EMBODIMENT OF THE INVENTION

Figure 5:
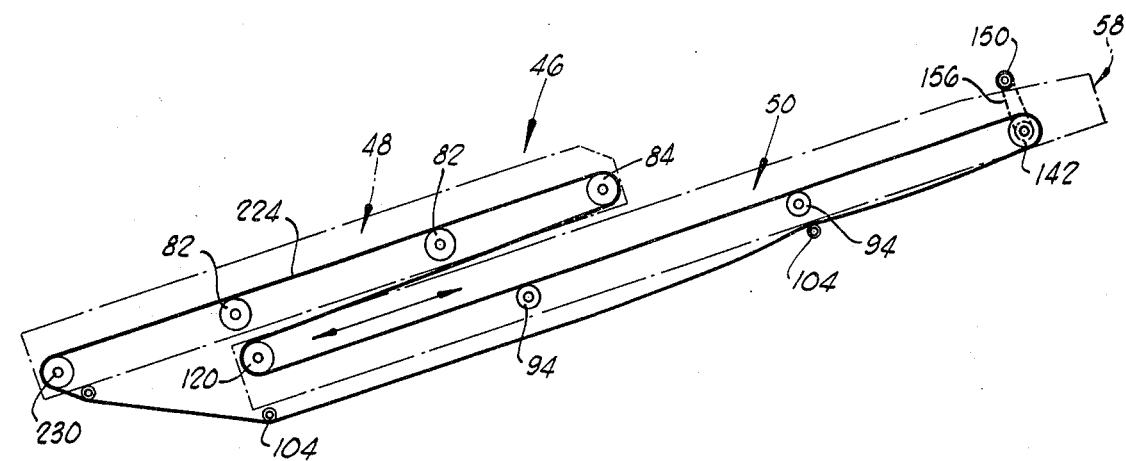
FIG. 5 is a detailed view showing the outer end of the elongated, telescoping conveyor at the location where chickens are discharged therefrom, and showing the structure employed to connect the elongated, telescoping conveyor to the upper side of one of the coop assemblies forming a part of the system of the invention.

Referring initially to FIG. 1 of the drawings, shown therein is a system for harvesting and transporting chickens structured in accordance with the present invention. The system includes a self-propelled vehicle 10 forming, with the included structures which are carried thereon, a harvesting apparatus of the type which is described in detail in my co-pending U.S. application Ser. No. 492,348 entitled "Method and Apparatus for Harvesting Domestic Fowl" and filed on July 26, 1974. The self-propelled vehicle 10 includes a main framework chassis 12 which is provided with forward wheels 14 and rear wheels 16. The vehicle carries a prime mover 18 such as a gasoline engine and supports an operator's seat 20.

At the forward end of the main framework chassis 12, a finger-carrying chicken harvesting means designated generally by reference numeral 22 is mounted. The finger-carrying chicken harvesting means 22 includes a plurality of parallel fingers 24 which are arranged in a plurality of spaced rows and are actuated to move through an endless path in a manner described in my co-pending application, which is incorporated herein by reference. In general, the fingers 24 are brought to a position such that they extend horizontally and move forwardly so as to project beneath chickens standing on the ground, and then gently lift the chickens upwardly and rearwardly with respect to the harvesting means 22 and the self-propelled vehicle 10.

Mounted on the forward side of the vehicle 10 is a transverse conveyor 26 which receives chickens discharged downwardly from the finger-carrying chicken harvesting means as the fingers 24 thereof are turned over at the top of their travel, and then commence to traverse the lower course of the endless chain and conveyor structure 28 upon which they are carried.

A vertical stanchion 30 is mounted rigidly at one side of the vehicle 12 adjacent the discharge end of the transverse conveyor 26 and carries at its upper end, a sheave or pulley 32. An upwardly and rearwardly projecting boom 34 has its forward end pivotally connected at 36 to a base pedestal 38 which supports the stanchion 30 so that the boom 34 can swing from side to side about a pivotal axis. At its outer end the boom 34 carries a sheave or pulley 40. A flexible line or cable 42 which has one end suitably anchored or secured to a structure projecting from the chassis 12 of the vehicle 10 is extended upwardly through the pulley or sheave 32 and is reaved through the sheave 40 and allowed to hang downwardly therefrom. At its lower end, the line or cable 42 carries a hook 44 which is utilized for a purpose hereinafter described.

An elongated telescoping conveyor 46 includes a forward or inner section 48 which projects slidingly into a rearward or outer section 50. The conveyor 46 is supported in operative position by an attachment of the hook 44 to an eye carried on a bracket 54 which is secured to the forward section 48 at a medial position or, stated differently, intermediate the length of the forward section. In this position, the conveyor 46 is suspended from the boom 34. The forward end portion of the conveyor 46 is pivotaly connected to the one side of the selfpropelled vehicle 10 by structure permitting the conveyor to swing horizontally, as well to be pivoted vertically, so that its outer end can be moved upwardly and downwardly. The forward end of the conveyor 46 is positioned directly beneath the discharge end of the transverse conveyor 26 for receiving chickens which pass from the discharge end of this conveyor through a chute 55 onto the forward end of the conveyor.

Pivotally secured to the underside of the rearward or outer section 50 of the conveyor 46, and projecting downwardly therefrom is a steering wheel subassembly designated generally by reference numberal 56. The details of structure of the steering wheel subassembly 56, as well as of the conveyor 46, will be hereinafter explained. At the outer end of the rearward section 50, this section of conveyor 46 carries a discharge chute subassembly 58. Immediately inwardly from the discharge chute subassembly 58 is a downwardly projecting coop connector subassembly 60 (hereinafter described) which engages the upper side of a multi-tiered coop assembly designated generally by reference numeral 62. The multi-tiered coop assembly 62 is shown resting upon a flat bed vehicle 64 which includes elongated, built-up supporting pedestals or risers 66 at opposite sides of the bed of a discharge conveyor which runs fore and aft along the bed of the truck between the risers 66, and is hereinafter described in detail.

The details of structure of the telescoping conveyor 46 are illustrated in FIGS. 3–7. The forward section 48 includes a pair of oppositely disposed, substantially parallel channel members 70 and 72 which open outwardly and constitute the principal structural and load-bearing members of the forward section 48 of the conveyor. Secured to the upper webs of each of the channel members 70 and 72 and projecting vertically therefrom are a pair of side plates 74 and 76. The side plates 74 and 76 are braced with respect to each other, and are reinforced, by means of a transversely extending forward plate 78, the bracket 54 and an end plate 80 which projects across and is secured to the upper side edges of the side plates 74 and 76.

Belt supporting rollers 82 and a belt guiding roller 84 are mounted in the forward section 48 of the conveyor 46 by means of axially extending shafts 86 and 88, respectively. The shafts 86 and 88 have their opposite ends secured to the web portions of the parallel channel members 70 and 72. The rollers 82 are horizontally spaced intermediate supporting rollers (not shown) which function to support an endless conveyor belts, hereinafter described, from the underside thereof.

The rearward or outer conveyor section 50 of the conveyor 46 includes a pair of oppositely disposed, parallel channel members 90 and 92 which open outwardly, and are positioned directly beneath the channel members 70 and 72, respectively. The channel members 90 and 92 constitute the principal load-bearing and strength imparting structural members of the conveyor section 50. Mounted between the channel members 90 and 92 of the rearward conveyor section 50 are a plurality of belt supporting rollers 94. The belt supporting rollers 94 are rotatably mounted on shafts 96. Each shaft has its opposite ends mounted in the web portions of the channel members 90 and 92. Near the inner or forward portion of the forward section 48, a pair of supporting brackets 98 and 100 are welded to the underside of the lower flange of the channel members 90 and 92 and function to support a shaft 102 upon which is rotatably journaled a belt supporting idler roller 104. At substantially this same location along the length of the rearward section 50, a pair of oppositely disposed guide plates 106 and 108 of angulated configuration are welded to the upper side of the upper flanges of the channel members 90 and 92. The angulated guide plates 106 and 108 are identically configured, and include horizontally projecting lower flanges 106a and 108a, respectively, vertically extending web portions 106b and 108b, respectively, horizontally extending upper flanges 106c and 108c, respectively, and vertically extending toe portions 106d and 108d, respectively. The toe portions 106d and 108d are secured to slide blocks 110 and 112, respectively, and these slide blocks are dimensioned to slidably fit within the channel members 70 and 72 as shown in FIG. 3.

Secured to the upper side of the upper flange of the channel members 90 and 92 and butted against the inner edge of the lower flanges 106a and 108a of the angulated guide plates 106 and 108 are a pair of journal blocks 114 and 116. The journal blocks 114 and 116 rotatably journal the opposite ends of a shaft 118 which extends axially through, and is keyed to, a belt guide roller 120.

At the outer or forward end of the forward conveyor section 48, a pair of angulated guide plates 124 and 126 are secured to the underside of the lower flange of the channel members 70 and 72 and project downwardly therefrom. The angulated guide plates 124 and 126 will be perceived, by comparison of FIGS. 3 and 4, to be substantially identical in their cross-sectional configuration to the angulated guide plates 106 and 108, but are reversed therefrom in their direction of vertical extension. The toe portions of the angulated guide plates 124 and 126 which project vertically downwardly at the lower side thereof are secured to a pair of slide blocks 128 and 130, respectively, and these slide blocks fit slidably within the channel formed by the channel members 90 and 92.

It will thus be perceived from the structure which has been described that the two sections 48 and 50 of the conveyor 46 are slidably connected to each other so that the conveyor can be telescoped by moving the rearward section 50 in and out of the forward or inner section 48. During this movement, the rearward section 50 is guided in its movement by the sliding cooperation of the slide blocks 110 and 112 with the channel members 70 and 72, and of the slide blocks 128 and 130 with the channel members 90 and 92.

Spaced longitudinally along the length of the rearward section 50 are a plurality of U-shaped frame members designated generally by reference numberal 132. Each of the frame members 132 includes a pair of substantially parallel, vertically projecting legs 132a and 132b, which legs are rigidly secured to the opposite ends of the transversely extending frame element 132c. Each transversely extending frame element 132c is welded to the lower side of the lower flanges of the channel members 90 and 92. The frame members 132 function to support and locate a pair of oppositely disposed, substantially parallel side plates 134 and 136 which project in vertical planes and are spaced horizontally by a distance sufficient to permit them to clear the channel members 70 and 72 of the forward conveyor section 48, the side plates 74 and 76 thereof, and also the angulated guide plates 106 and 108, all as best illustrated in FIG. 4 of the drawings.

At the outer end of the outer or rearward section 50 of the conveyor 46, a shaft 138 is extended between and journaled in the channel members 90 and 92. One end of the shaft 138 projects through the channel memeber 92 and carries at the end thereof to one side of the rearward section 50, a sprocket 140 which is keyed to the shaft 138 for rotation therewith. A guide roller 142 is mounted on a medial portion of the shaft 138 for rotation with the shaft and is disposed between the channel members 90 and 92. As shown in FIG. 5 of the drawings, a pair of end cap plates 144 and 146 are secured across the exposed outer or rearward most ends of the channel members 90 and 92. A hydraulic drive motor 150 is secured to the upper side of the transverse plate 151 which is secured across the rearward section 50 between the side plates 134 and 136 thereof. A drive shaft 152 projects from the hydraulic motor and has keyed thereto a drive sprocket 154. The drive sprocket 154 engages a drive chain 156 which extends around the sprocket 140 keyed to the shaft 138. In this way, the guide roller 142 is driven in rotation from the hydraulic motor 150 to impart a linear drive to an endless conveyor belt (hereinafter described) which is extended around the guide roller 142.

A pair of downwardly projecting angle brackets 158 and 160 are bolted to the underside of the lower flanges of the channel members 90 and 92 for the purpose of pivotally supporting the coop connector subassembly 60. The coop connector subassembly 60 includes a connection frame 162 which extends between the brackets 158 and 160. The connection frame 162 carries a connector pin 164 which projects downwardly therefrom into a tubular sleeve 166 which is secured to a flanged positioning plate 167 which can be engaged with the multi-tiered coop assembly 62 in a manner and for a purpose hereinafter described.

The discharge chute subassembly 58 which is connected to the outer or rearward end of the rearward section 50 includes a cover plate 170 which is inclined downwardly slightly with respect to the horizontal, and has suspended therefrom a plurality of flexible flaps 172 forming a flexible chute through which chickens are dischared from the conveyor 46 into the multi-tiered coop assembly 62 in a manner hereinafter described. A handle 173 projects outwardly from the plate 170 to facilitate manual positioning of the conveyor 46 by an operator standing on the coop assembly 62.

The details of construction of the steering sheel subassembly 56 are best illustrated in FIGS. 1 and 7. The steering wheel subassembly 56 includes a pair of suspension plates 180 and 182 which are welded to the lower side of the lower flange of the channel members 90 and 92 and project downwardly therefrom. A pair of angulated attachment plates 184 and 186 have the upper end portions thereof pivotally secured to the suspension plates 180 and 182 by means of pivot pins 188 and 190. The lower end portions of the angulated attachment plates 184 and 186 are secured to a pair of downwardly converging angle members 192 and 194, which angle members are interconnected by a transverse brace 196. A wheel frame supporting block 198 is welded or otherwise suitably secured between the lower ends of the convergent angle members 192 and 194.

A wheel frame includes a pair of substantially parallel wheel supporting plates 200 and 202, which plates carry at one end, a pair of lobes 204 and 206. An axle 208 is extended between the lobes and rotatably supports the guide wheel 210 which is journaled on the axle. At the opposite ends of the wheel supporting plates 200 and 202 from the ends which carry the lobes 204 and 206, the wheel plates are secured to a pivot block 212 which is pivotally supported from the wheel frame supporting block 198 by means of a pivot pin 214 which projects through the supporting block 198 and the pivot block 212. The wheel frame is thus permitted to pivot or swivel about a vertical axis which is coincident with the axis of the pivot pin 214. A steering handle 216 has one of its ends rigidly secured to the pivot block 212 and is suspended at its other end by a flexible chain 218 which is connected to a suitable bracket 219 projecting downwardly from the lower side of the rearward section 50 of the conveyor 46.

Figure 6:
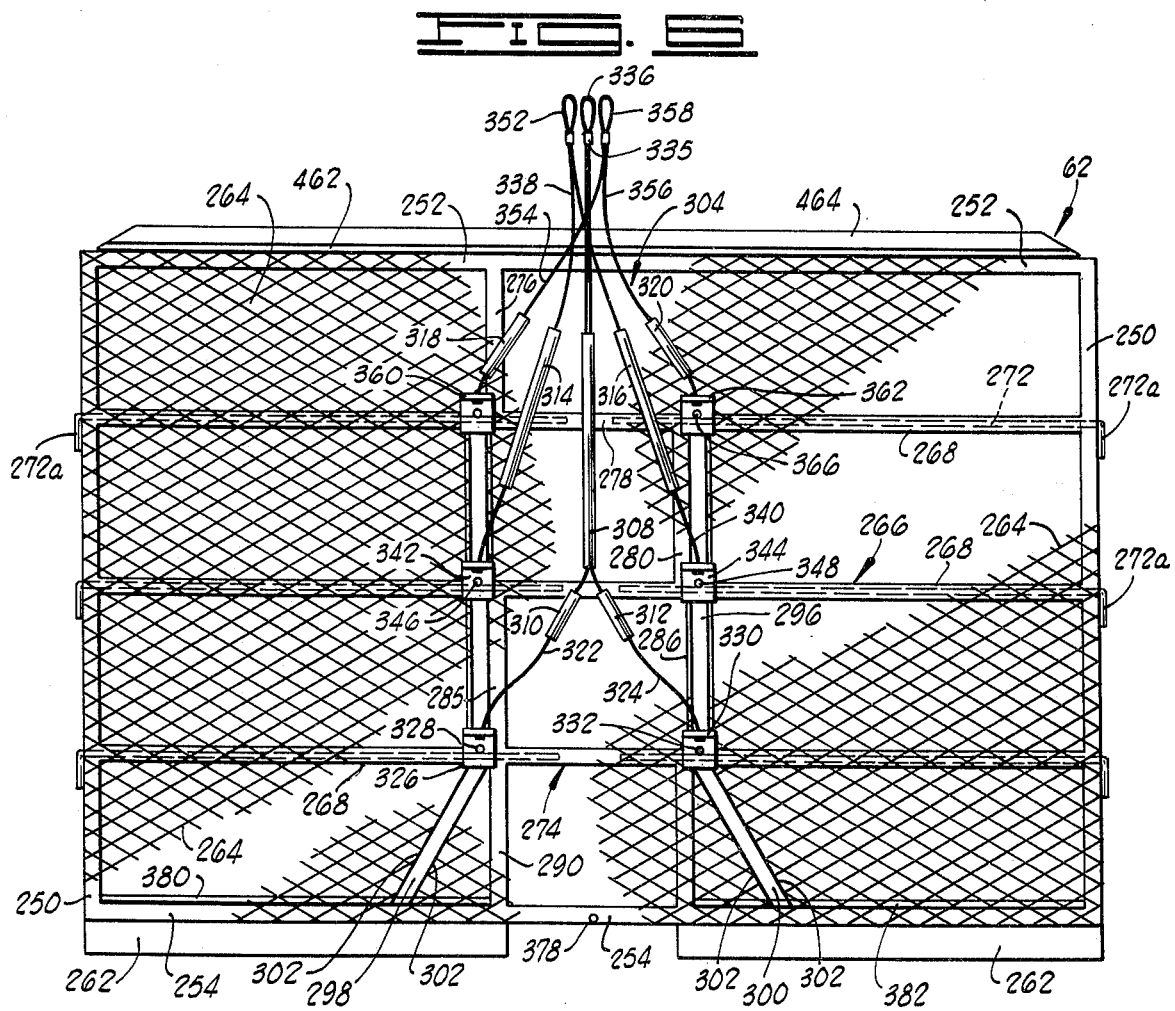
FIG. 6 is a schematic view illustrating the manner in which an endless belt is employed in the telescoping conveyor of the invention.

The elongated telescoping conveyor 46 includes, as a transporting element thereof, an elongated endless flexible belt 224 which is extended over the several rollers hereinbefore described. The arrangement of the belt and the rollers carried by the forward section 48 and rearward section 50 of the conveyor 46 is schematically illustrated in FIG. 6. It will be noted that the belt 224 is passed over a plurality of supporting rollers 82 so that the upper surface of the belt is exposed for carrying chickens where it traverses the length of the forward section 48 of the conveyor 46. As the outer end of the forward section 48, the belt 224 passes around a guide roller 84 and reverses direction. The belt then passes through a 180° turn around the guide roller 120 supported between the channel members 90 and 92 at the inner of forward end of the rearward or outer section 50. After reversing direction in this manner, the belt passes outwardly along the rearward section 50 over a plurality of idler supporting rollers 94. These rollers are rotatably supported on suitable shafts 96 extended between the web potions of the channel members 90 and 92 as shown in FIG. 4.

At the outer or rearward end of the rearward section 50 of the conveyor 46, the belt 224 is passed through a 180° turn around the guide roller 142, and from thence passes inwardly along the underside of the rearward section 50 of the conveyor. The guide roller 142 is driven in rotation from the hydraulic motor 150 via the drive chain 156 and drive sprocket 154. The lower course of the endless belt 224 is guided and supported by a plurality of idler rollers 104 which are mounted beneath the channel members 90 and 92 in the manner shown in FIG. 3 of the drawings. From the innermost of the idler rollers 104, the endless belt 224 extends upwardly and further inwardly until it is passed around a guide roller 230 which is disposed at the innermost end of the forward section 48 of the conveyor 46.

From the description of the manner in which the endless belt 224 is mounted on the various supporting guide rollers carried by the two sections 48 and 50 of the telescoping conveyor 46, it will be perceived that as the rearward or outer section 50 moves inwardly with respect to the stationary forward or inner section 48, the guide roller 120 is caused to be moved further from the guide roller 84 carried at the outer end of the forward section 48. Thus, despite the inward movement of the rearward section 50 upon the forward section 48, the overall length of the endless belt 224 is maintained constant, and tension is maintained in the belt while the telescoping movement of the two conveyor sections is nevertheless accomodated.

The capability of the elongated telescoping conveyor 46 to undergo a selective change in its overall length as a result of the telescoping movement can next be considered in conjunction with a consideration of the function of the steering wheel subassembly 56. Substantially all of the weight of the conveyor 46 is carried by the line or cable 42 and transmitted through the boom 34 to the self-propelled vehicle 10. Nevertheless, by control of the cable 42, the outer end of the conveyor 46 can be lowered so that the guide wheel 210 of the steering wheel subassembly 56 contacts the floor or ground where the harvesting and transporting system of the invention is to be utilized. At this time, the conveyor 46 may be accurately positioned in respect to a multi-tiered coop assembly 62 by grasping the elongated steering handle 216, lifting it upwardly to relieve the tension in the chain 218 and then swiveling the entire wheel frame carried at the lower end of the converging angle members 192 and 194 in a direction to permit the guide wheel 210 to function as a caster, and to guide the swinging or pivoting, laterally-directed movement of the elongated telescoping conveyor 46.

Once the coneyor 46 has been swung to the proper position in relation to one of the coop assemblies 62, the connector pin 164, sleeve 166 and positioning plate 167 can be positioned against the upper side of the coop assembly. When such engagement is effected, the finger-carrying chicken harvesting means 22 can then be actuated to gather and lift chickens from the floor of the building where they are to be harvested, move them upwardly, and transfer them to the transverse or cross conveyor 26 from which the chickens can be discharged onto the upper course of the endless belt 224 as it traverses the forward section 48 of the telescoping conveyor 46. The chickens are then moved outwardly to the location where the belt 224 is wrapped through 180° about the guide roller 84. Here they are gently deposited upon the run of the endless belt 224 which is traversing the length of the rearward section 50 of the conveyor 46. Finally, the chickens are passed through the discharge chute subassembly 58 at the outer end of the rearward section 50 and deposited in the multitiered coop assembly 62, in a manner hereinafter described in greater detail.

The details of construction of one of the multi-tiered coop assemblies 62 forming a part of the system of the invention are illustrated in FIGS. 8-11 of the drawings. Each coop assembly 62 can be described generally as a cage of rectangular parallelepiped configuration having a plurality of floors therein forming multiple tiers for the containment of chickens placed therein for shipment. The cage is formed by a plurality of vertically extending or upright frame members 250 which frame members are secured, at their upper ends, to an enlongated, horizontally extending top frame member 252, and at their lower ends to an elongated, horizontally extending bottom frame member 254. The frame members 250 are also secured to a pair of transversely and horizontally extending top frame member 256 and a pair of transversely and horizontally extending bottom frame members 258. A plurality of transversely extending intermediate frame members 260 which are vertically spaced from each other also serve to interconnect the vertically extending frame members 250, and to complete the right parallelepiped configuration of the cage forming the general structure of each coop assembly 62. The cage rests upon two pairs of horizontally spaced tubular channel members 262 of rectangular cross-sectional configuration.

Figure 11:
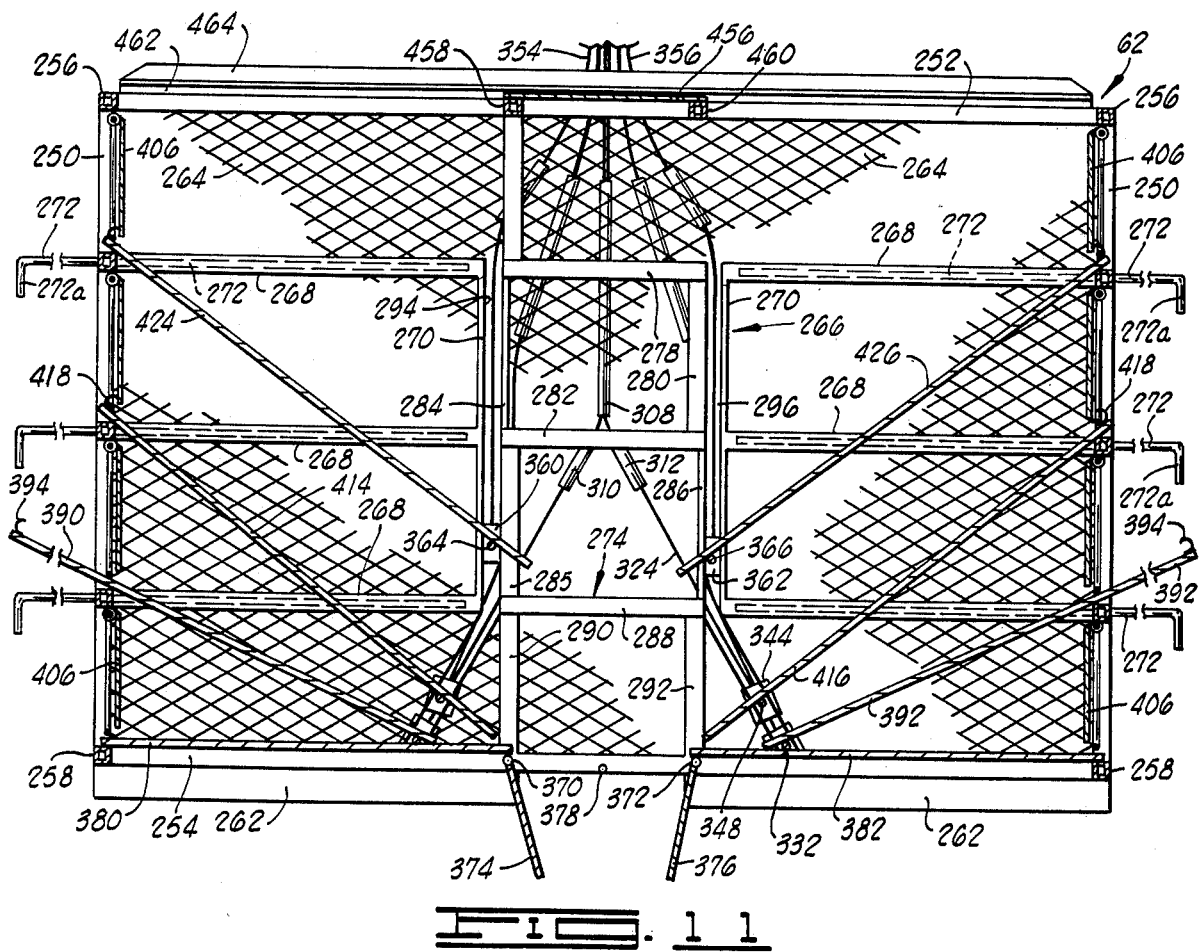
FIG. 11 is an internal sectional view taken in a vertical plane alongside and parallel to the inner side wall of one of the coop assemblies of the invention, and illustrating the manner in which the floors used to form multiple tiers in the coop assembly are permitted to collapse for the purpose of discharging chickens.

As is illustrated in FIGS. 8 and 11, the coop assembly 62 is provided with a pair of opposed sides which are each covered by a reticulated mesh or screen material 264 which is secured at its upper edge to the frame member 252, at its lower edge to the frame member 254 and at its side edges to the vertically extending frame members 250. A channel network, designated generally by reference numeral 266, is disposed between the frame members 250, 252 and 254 at each side of the coop assembly 62 behind the reticulated mesh or screen material 264 and includes a plurality of horizontally extending, vertically spaced tubular members 268. Each of the vertically spaced, horizontally extending tubular members 268 has one of its ends welded to one of the vertically extending frame members 250, and its opposite end welded or otherwise suitably secured to a vertically extending plate 270. Two of the vertically extending plates interconnect the three aligned inner ends of the three tubular members 268 extending inwardly from each of the vertically extending frame members 250. It will be noted that this pattern of the network 266 is repeated or duplicated on opposite sides of each of the side walls constituted by the reticulated mesh or screen material 264 and the frame members which support it. It should also be here pointed out that a hole or aperture is formed through each of the vertically extending upright frame members 250 in alignment with the bore or passageway through each of the vertically spaced, horizontally extending tubular members 268 to facilitate the insertion into the respective tubular members 268 from outside the coop assembly 262 of an elongated supporting rod 272 which is bent over through a right angle at the outer end thereof to form a handle portion 272a. Each of the supporting rods 272 is longer than the respective tubular member 268 into which it is slidingly inserted for a purpose hereinafter described.

At a central portion of each of the sides of the coop assembly 62 formed by the reticulated screen material 264, a floor supporting framework, designated generally by reference number 274, is located. Each floor supporting framework 274 includes a vertically extending tubular frame member 276 which has its upper end secured to an intermediate portion of the horizontally extending top frame member 252 and its lower end secured to a horizontally extending tubular frame member 278. The horizontally extending tubular frame member 278 is positioned in alignment with the two uppermost tubular members 268 of the channel network 266, and has its opposite ends open to receive the inner ends of the pair of elongated supporting rods 272 which are slidably inserted in the respective aligned tubular members 268.

Secured to the lower side of the frame member 278 and projecting downwardly from one end thereof is a tubular frame member 280. The lower end of the tubular frame member 280 is welded or otherwise suitably secured to a horizontally extending tubular frame member 282 forming a part of the floor supporting framework 274. The opposite end of the horizontally extending tubular frame member 282 is connected to the horizontally extending tubular frame member 278 by a vertically extending plate 284. The opposite ends of the tubular frame member 282 are open and are aligned with an opposed pair of the tubular members 268 to receive the inner ends of the pair of elongated supporting rods 272 which are slidably supported in the tubular members 268.

Extending downwardly from one end of the horizontally extending tubular frame member 282 toward the transversely extending bottom frame member 254 is a vertically extending tubular frame member 285. At the opposite end of the horizontally extending tubular frame member 282, a downwardly extending plate 286 has its lower end secured to a horizontally extending tubular frame member 288 which is positioned in alignment with the lowermost of the vertically spaced, horizontally extending tubular members 268 of the channel network 266. The opposite ends of the horizontally extending tubular frame member 288 are open, and are in alignment with the elongated supporting rods 272 carried in the aligned, lowermost tubular members 268 so that the rods can be reciprocated into the tubular frame member 288 for a purpose hereinafter described. Finally, a pair of vertically extending, substantially parallel tubular frame members 290 and 292 interconnect the horizontally extending tubular frame member 288 with the bottom frame member 254.

In referring to the floor supporting framework 274 as it is best illustrated in FIGS. 8 and 11, it will be perceived that a track is defined by the spaces 294 and 296 existing between the respective vertically extending plates 270 and the respective tubular frame members 280 and 285 which are horizontally spaced therefrom, along with the vertically extending plates 284 and 286. The tracks constituted by the spaces 294 and 296 intersect at their lower ends, and communicate with, a pair of downwardly and outwardly inclined tracks 298 and 300 formed in the corresponding side walls of the coop assembly 62. The tracks 298 and 300 are formed by relieving portions of the reticulated mesh or screen material 264, and then welding boundary defining rods 302 to the exposed edges of the reticulated material 264 where it has been cut away.

A floor control system used in conjunction with the floor supporting framework 274 is mounted on the opposite sides of the coop assembly 62, and each of the floor control systems is designated generally by reference numeral 304. Each of the floor control systems 304 is identically constructed to the other and each includes a plurality of cable guide sleeves. Thus, the floor control systems 304 depicted in FIGS. 8 and 11 includes a centrally disposed, vertically extending cable guide sleeve 308 which is welded or otherwise suitably secured to the reticulated screen material 264. Below the lower end of the cable guide sleeve 308, a pair of short, branch cable guide sleeves 310 and 312 are welded to the reticulated mesh material 264. On opposite sides of the centrally located cable guide sleeve 308, a pair of intermediate floor cable guide sleeves 314 and 316 are welded to the reticulated mesh material 264, and finally, a pair of top floor guide sleeves 318 and 320 are welded to the outer side of the reticulated mesh material.

The several guide sleeves 308-320 secured to the reticulated mesh material 264 at opposite sides of the coop assembly 62 function as guides for cables or other flexible members used to effect selective and sequential release of the several floors used in the coop assembly in a manner hereinafter described. The cables are employed in the floor control system 304 in pairs, with a first pair of cables 322 and 324 being utilized to control the position of the lowermost collapsible floor in the coop assembly, such floor constituting the second tier of the assembly. The cable 322 in each of the floor control systems 304 is connected at its lower end to a rod receiving plate 326 located at the outer side of the reticulated mesh material 364.

It will be understood that a pair of the rod receiving plates 326 are disposed on opposite sides of the right parallelepiped cage of the coop assembly 62 and, in this location, are positioned to receive the opposite ends of a transversely extending, floor supporting rod 328. In like manner, the lower ends of the cables 324 are connected to rod receiving plates 330 disposed at opposite sides of the coop assembly and receiving the opposite ends of a transversely extending floor supporting rod 332. It will be noted by referring to FIGS. 8 and 11 that the transversely extending floor supporting rods 328 and 332 have their opposite end portions projected through the spaces 294 and 296 hereinbefore described as defining vertically extending channels, and that these floor supporting rods can move vertically in these channels during actuation of the floor control system 304 in a manner hereinafter described. The control cables 322 and 324, after extension upwardly through the cable guide sleeves 310 and 312, and through the central guide sleeve 308, are interconnected through a suitable clamp 334 to form a loop 336 at the upper end thereof.

For the purpose of controlling the movements of the aligned floors constituting the third tier in the coop assembly 62 and hereinafter described, a pair of control cables 338 and 340 are projected downwardly through the cable guide sleeves 314 and 316 and have their lower ends connected to a pair of rod receiving plates 342 and 344. The rod receiving plates 342 disposed on opposite sides of the coop assembly 62 are secured to the opposite ends of a transversely extending floor supporting rod 346, and the rod receiving plates 344 at opposite sides of the coop assembly are secured to a transversely extending floor supporting rod 348. The floor supporting rods 346 and 348 extend through the spaces 294 and 296 hereinbefore described, and are movable vertically in the channels formed by these spaces. After extension through the cable guide sleeves 314 and 316, the control cables 338 and 340 are interconnected at their upper ends to form a loop 352.

In controlling the position and movements of the top floors constituting the uppermost tier of the coop assembly 62, a pair of upper control cables 354 and 356 are provided and are extended from a joining loop 358 at their upper ends down through the top floor guide sleeves 318 and 320. At their lower ends, the control cables 354 and 356 are connected to a pair of rod receiving plates 360 and 362, respectively. The rod receiving plates 360 disposed on opposite sides of the coop assembly 62 receive the opposite ends of a transversely extending floor supporting rod 364 which is movably mounted in the channel constituted by the space 294. In like manner, the rod receiving plate 362 receives the opposite ends of a transversely extending floor supporting rod 366 which projects through the opposite walls of the coop assembly 62 at the location of the space 296 and is vertically movably in the channel defined by this space. As previously indicated herein, the thus constituted floor control systems 304 disposed at opposite sides of the coop assembly 62 are identically constructed, and the operation of these floor control subassemblies in conjunction with an actuating mechanism mounted atop the coop assembly will be hereinafter described in detail.

Extending between the horizontally extending bottom frame members 254 at the lower side of the coop assembly are a pair of horizontally spaced pivot rods 370 and 372. The pivot rods 370 and 372 have their opposite ends journaled in the opposed parallel bottom frame members 254 for pivotal movement in these frame members and, at a location disposed inwardly of the pairs of tubular channel members 262 disposed at opposite sides of the coop assembly 62, these rods carry discharge flaps 374 and 376. The discharge flaps 374 and 376 are each substantially rectangular in configuration and are dimensioned so that when the discharge flaps are pivoted upwardly on the rods 370 and 372 into substantially horizontal alignment, one of the flaps slightly overlaps the other to provide substantially monoplanar continuity to the bottom plates constituting the lowermost tier of the coop assembly. At the time when the discharge flaps 274 and 276 are pivoted upwardly to their overlapping, substantially horizontally extending positions, they are retained and supported in this position against downward pivotal movement under the influence of gravity by a support rod 378 which is extended through a pair of aligned holes formed in the center of each of the horizontally extending bottom frame members 254. The discharge flap supporting rod 278 can be slidably removed from the supporting position in which its ends pass through the apertures or holes in the bottom frame members 254 to permit the discharge flaps 374 and 376 to pivot downwardly to a discharge position, such as that shown in FIGS. 11 and 12.

A stationary and permanent floor constituting the lowermost tier of the coop assembly 62 is formed by a pair of plates 380 and 382 which are welded or otherwise suitably secured between the opposed bottom frame members 254, and, at their opposite side edges, to the transversely extending bottom frame members 258. The inner edges of the plates 380 and 382 terminated just above the pivot rods 370 and 372 to define a space between these inner edges through which chickens discharged from the coop assembly 62 in a manner hereinafter described.

The second tier of each of the coop assemblies 62 is formed by a pair of removable floor panels 390 and 392. Each of the floor panels 390 and 392 is substantially rectangular in configuration and has a width, as measured transversely of the coop assembly 62, which is less than the distance which separates the vertically spaced, horizontally extending tubular members 268 forming a part of the channel network 266. The dimensions of the floor panels 390 and 392, as measured in a direction normal to this transverse dimension, is such that the floor panels extend almost to a position of contact with each other at their inner edges when they are in their horizontally extending, chicken-supporting positions as hereinafter described.

Figure 9:
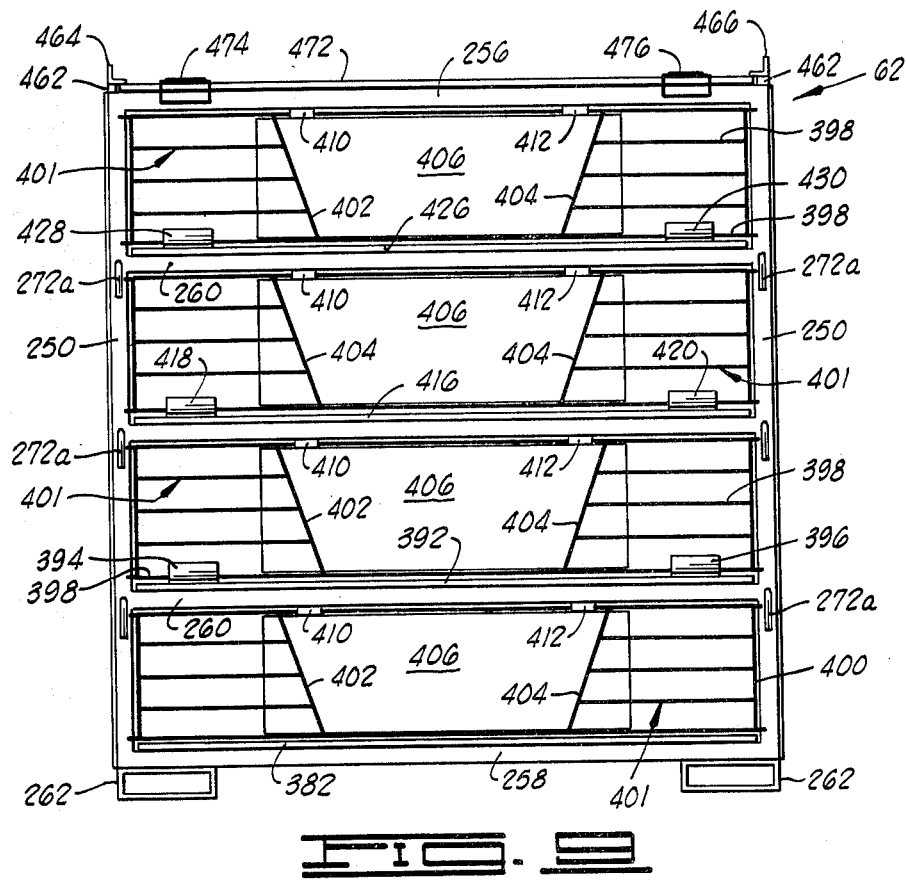
FIG. 9 is a side elevation view of the coop assembly shown in FIG. 8, but with the assembly turned through 90° to present to view a different side of the coop assembly.

Secured to each of the floor panels 390 and 392 adjacent the outermost transverse edge thereof are a pair of curved pivot plates 394 and 396 (see FIGS. 9 and 11). When the floor panels 390 and 392 are extended all the way into the interior of the rectangular parallelepiped cage of the coop assembly 62, and are in their horizontally extending, chicken-supporting positions, the curved pivot plates 394 and 396 carried at the outer side edges of the two floor panels hook over and pivotally engage a parallel, horizontally extending rod 398 which is welded between vertically extending rods 400 as shown in FIG. 9. A plurality of the horizontally extending rods 398 and the vertically extending rods 400 form a lattice 401 which is mounted in position to form a closure of the opening defined between the lowermost frame member 260 and the bottom frame member 258. Identical lattices 401 are also used to close the openings between adjacent pairs of intermediate frame members 260 and between the top frame member 256 and the next lower frame member 260. In referring to FIG. 9, it will be noted that, except for the uppermost and lowermost of the rods 398 in each of the lattices, the inner ends of the horizontally extending rods 398 are secured to inclined converging rods 402 and 404 forming a part of each lattice 401. An opening is thus defined at the central portion of each of the lattices 401, and each of these openings is closed by a trapezoidally configured pivoting gate plate 406. Each gate plate 406 is pivotally supported from the uppermost horizontally extending rod 398 in each of the lattices by a pair of curved hinge plates 410 and 412, similar to the curved pivot plates 394 and 396 hereinbefore described as carried by the floor panels.

In referring to FIG. 9, it will also be noted that the removable floor panels 390 and 392 are supported at one end upon the lowermost of the three intermediate frame members 260 utilized in the illustrated embodiment of the invention, and are arranged, when these floor panels are in their chicken-supporting positions, so that the curved pivot plates 394 and 396 hook over the lowermost horizontally extending rod 398 in the lattice 401 immediately above this lowermost intermediate frame member 260.

The third tier within the coop assembly 62 is formed by a pair of oppositely disposed floor panels 414 and 416. The floor panels 414 and 416 are substantially rectangular in configuration and are of equal size and dimensions to the floor panels 390 and 392. Thus, when the floor panels 414 and 416 are in their horizontally extending, chicken-supporting positions, the inner edges of these panels are quite near to each other, and the panels are in horizontal alignment. At their outer side edges, the floor panels 414 and 416 each carry a pair of curved or arcuate pivot plates 418 and 420, and these pivot plates hook over and pivotally engage the lowermost horizontally extending rod 398 in one of the lattices 401 hereinbefore described.

The uppermost tier within the coop assembly 62 is formed by a pair of removable floor panels 424 and 426. These floor panels are identically configured to those previously described, and occupy substantially the same relationship to each other, when in their horizontally aligned, chicken-supporting positions, as those floor panels previously described. The floor panels 424 and 426 carry, at their outer side edges, a pair of arcuate or curved pivot plates 428 and 430 which hook over and pivotally engage the lowermost horizontally extending rod 398 in the respective lattice 401.

Figure 10:
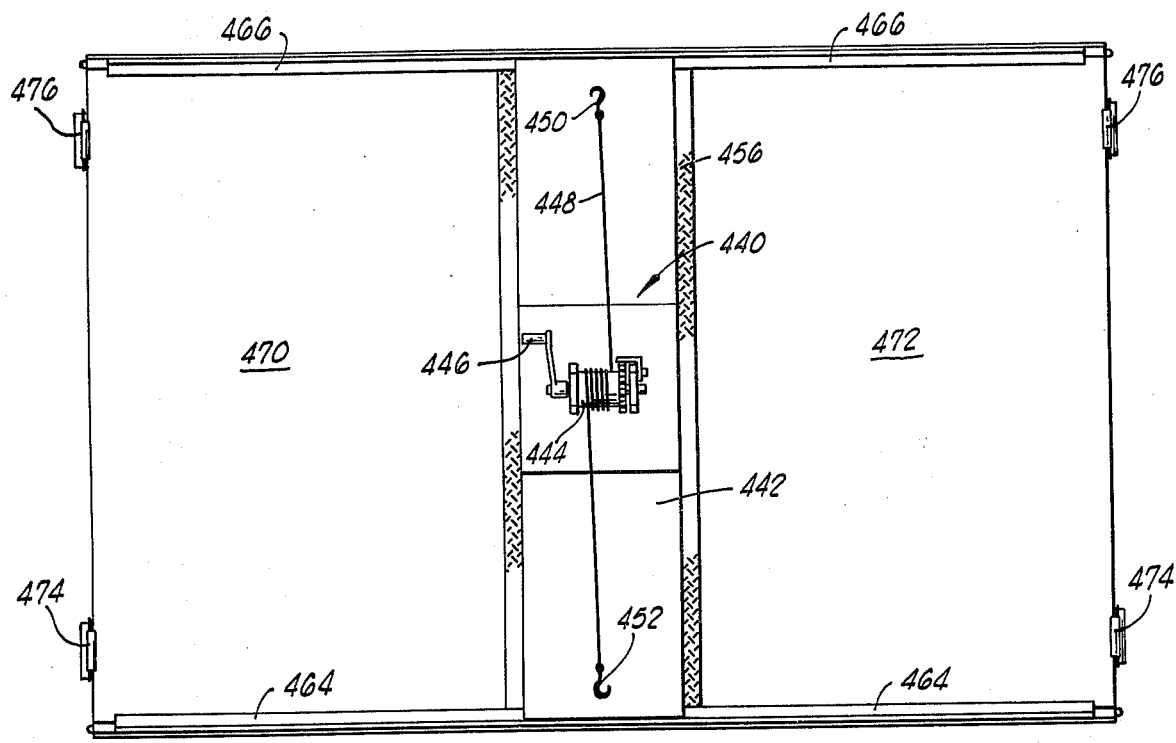
FIG. 10 is a plan view of one of the coop assemblies of the present invention illustrating a removable wench subassembly utilized in conjunction with the coop assembly during certain phases of the operation of the system.

A subassembly which cooperates with the floor control assemblies 304 is a winch subassembly, designated generally by reference numeral 440 and illustrated in FIG. 10. The winch subassembly 440 includes an elongated, rectangularly configured subplate 442 which has mounted in the center thereof, a winch drum 444 which can be rotated by means of a crank or handle 446. The winch drum 444 has wound thereabout, an elongated flexible member or cable 448 which is extended from opposite sides of the drum 444, and carries a pair of hooks 450 and 452 at its opposite ends. The hooks 450 and 452 are engageable with the loops 336, 352, and 358 formed at the upper ends of the control cable pairs in the manner hereinbefore described. During such engagement, the winch subassembly 440 is used to raise and lower the several floor panels forming tiers in the coop assembly 62 in the manner hereinafter described.

The subplate 442 of the winch subassembly 440 rests upon a transversely extending stand plate 456 which is welded to the upper side of a pair of transversely extending tubular frame members 458 and 460 (see FIG. 11). The transversely extending tubular frame members 458 and 460 have their opposite ends welded, or otherwise suitably secured, to the opposed, substantially parallel horizontally extending top frame members 252 of the coop assembly 62. A pair of spacer elements 462 are secured to the upper surfaces of the top frame members 252, and function to support a pair of elongated angle members 464 and 466 which are welded to the spacers 462 immediately over the top frame members 252, and extend across the stand plate 456.

To close the top of the coop assembly 62 when it has been loaded with chickens (as well as to permit access to the several tiers of the assembly during loading of the chickens), a pair of removable top panels 470 and 472 are slid inwardly to the position illustrated in FIG. 10, with the opposed side edge portions of each of the panels fitting in tracks or channels formed by the horizontally extending flange portions of the angle members 464 and 466 and the underlying upper surface of the top frame members 252. At their inner edges, the top panels 470 and 472 abut the transverse edges of the stand plate 456 to effect the complete closure of the upper side of the coop asembly 62.

Figure 12:
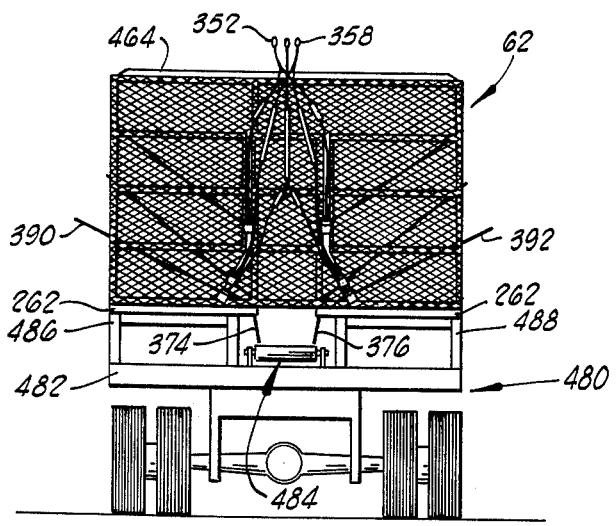
FIG. 12 is a rear elevation view of a truck and conveyor with one of the coop assemblies located thereon and cooperating with the truck and conveyor in accordance with the present invention.

In a preferred embodiment of the invention, the final element of the chicken harvesting and transporting system of the invention comprises a second self-propelled vehicle. Such vehicle is illustrated in FIG. 12 of the drawings, and is there designated generally by reference numeral 480. The vehicle is a flat bed truck having a rearwardly extending bed 482 formed thereon, and having a fore-and-aft, or rearwardly extending, endless belt conveyor subassembly 484 mounted on the central portion of the truck, and projecting rearwardly therefrom a slight distance. Positioned on opposite sides of the endless belt conveyor subassembly 484 are a pair of coop assembly supporting riser 486 and 488. The supporting risers 486 and 488 are elevated at their upper sides from the bed 482 by a distance sufficient that, when one of the coop assemblies 62 is supported on the risers, the coop assembly is spaced upwardly from the conveyor subassembly 484, and clearance is provided which is adequate to permit the discharge flaps 474 and 476 and to be released to the downwardly extending position immediately over the conveyor subassembly 484 as shown in FIG. 12.

OPERATION

In the use of the poultry harvesting and transporting system of the invention, the self-propelled vehicle 10 is driven into a poultry house of the type used for raising the poultry. As the vehicle is driven through the bays in the house, the finger-carrying chicken harvesting means 22 is hydraulicly lowered to a harvesting position in which the fingers 24, at the lowermost point in their travel, pass adjacent the floor. The fingers 24 are moved in a continuous, generally circular path as the self-propelled vehicle 10 is moved forwardly, and the result is that the chickens are picked up by the fingers and elevated to a position where they are discharged to the cross conveyor 26. This operation of picking up or harvesting the chickens is explained in my copending application Ser. No. 492,348 previously referenced herein.

The chickens are moved by the cross conveyor 26 to the point where they are discharged through the chute 55 onto the forward or inner end of the elongated telescoping conveyor 46. Chickens are moved outwardly on the conveyor 46, initially on the forward or inner section 48 thereof, and then upon the rearward or outer section 50 thereof, in a manner hereinafter described. Prior to commencing the loading of the chickens, it may be desirable, on many occasions, to initially position the outer end of the conveyor at a proper location to discharge chickens into one of the coop assemblies 62. For this purpose, the plate 167 is positioned inside one of the elongated angle members 464 or 466 at the top of the coop assembly, and functions to retain the upper end of the conveyor 46 in the proper orientation to discharge chickens into the coop assembly 62.

Positioning of the telescoping conveyor 46 at the selected location for loading a coop assembly 62, either resting on the floor of the poultry house or mounted on a truck as shown in FIG. 1, is accomplished through the use of the steering wheel subassembly 56. Preferably, also, the cable 42 can be lengthened or shortened by the use of a suitable winch (not shown) disposed on the self-propelled vehicle 10. Finally, some manual fine adjustment of the positon of the outer end of the telescoping conveyor 46 can be accomplished by the use of the handle 173. As chickens reach the outer end of the telescoping conveyor 46, they are shielded from the fact that they are about to be dropped downwardly into the coop assembly 62 by the flexible flaps 172 carried by the discharge chute subassembly 58.

In a preferred mode of using the system of the invention, one or more of the coop asemblies 68 is positioned across the bed of the flat bed vehicle 64 in the manner illustrated. This vehicle is preferably constructed in the manner shown in FIGS. 1 and 12 to include an elongated centrally disposed conveyor subassembly 484 for a purpose hereinafter described.

Each coop assembly 62 is prepared, prior to the loading of chickens therein, to initially load chickens upon the lowermost tier constituted by the floor plates 380 and 382 and the then aligned, horizontally extending, discharge flaps 374 and 376. In order to first load the chickens on this lowermost tier of the coop assembly 62, the top panels 470 and 472 are first removed from the top of the coop assembly by sliding them out of the tracks formed between the elongated angle members 464 and 466 and the horizontally extending top frame members 252. A workman, at this time, can either straddle the top of the right parallelepiped cage constituting the general structure of the coop assembly 62, or he may stand upon the stand plate 456 which extends transversely across the upper side of the coop assembly.

After the top panels 470 and 472 are removed, the three sets of floor panels 390, 392, 414, 416 and 424, 426 are removed. Thus, the upper set of floor panels 424 and 426 are removed by pulling them outwardly toward those sides of the coop assembly 62, one of which is illustrated in FIG. 9. Outward pull of the floor panels 424 and 426, as well as the remainder of the removable floor panels, can be accomplished by pulling on the arcuate or curved pivot plates 428 and 430 carried at the outer side edges of these floor panels.

It should perhaps be explained at this point that prior to their removal from the interior of the coop assembly 62, the floor panels will generally be supported in a horizontally extending, chicken-supporting position within the cage. This is accomplished by first pulling the several rod-receiving plates 326, 330, 342, 344, 360 and 362 upwardly by means of the paired control cables connected thereto until the respective transversely extending floor supporting rods 328, 332, 346, 348, 364, and 366 extend transversely across the interior of the coop assembly at levels immediately beneath the horizontal level which is to be occupied by the respective removable floor panels.

After the rod-receiving plates, and transversely extending floor supporting rods carried thereby have been elevated by the use of the winch subassembly 440 in a manner hereinafter described, the elongated supporting rods 272 are pushed inwardly, using the handle portions 272a of each until the innermost ends of these rods project across the channels or tracks constituted by the spaces 294 and 296, and into the hollow interior of the aligned tubular frame members 278, 282 and 288 (as shown in dashed lines in FIG. 8). It will be perceived that the elongated supporting rods 272, in this position, support the transversely extending floor supporting rods, 328, 332, 346 and 348 and that the floor supporting rods, in turn, will support the several floor panels 390, 392, 414, 416, 424 and 426 when they are pushed all the way in to their chicken-supporting positions.

Returning to the discussion of the operation of loading the coop assembly 62, the top panels 470 and 472 are first removed by sliding them out of their receiving channels in the manner hereinbefore described. The workman standing on top of the coop assembly 62 aids workmen standing at opposite ends of the coop assembly in pulling the several floor panels toward the opposite sides of the coop assembly (as shown in FIG. 9) to thus remove the floor panels. The several rod-receiving plates 326, 330, 342, 344, 360 and 362 are then gradually lowered in the slots or spaces 294 and 296 forming the tracks, and into the registering downwardly and outwardly inclined tracks 298 and 300.

When the floor panels 390, 392, 414, 416 and 424, 426 have been pulled out of the coop assembly 62, the chickens can be placed in the coop assembly, and are allowed to come to rest upon the floor plates 380 and 382. At this time, the discharge flaps 374 and 376 are pivoted upwardly, and are held in a horizontal, overlapping position by an elongated rod 378 which is extended through the centrally located apertures or holes in the horizontally extending bottom frame members 254.

After the bottom tier has been filled with chickens, the floor panels 390 and 392 are pushed back into their horizontally extending, aligned positions with the aid of the workmen standing upon the coop assembly 62. The loop 336 of the control cables 322 and 324 is engaged with the hook 452 on the end of the cable 448 wound upon the winch 440 and, using the winch handle 446, the cable is wound upon the winch drum 440 to pull the control cables 322 and 324 upwardly until the rod-receiving plates 326 and 330 are in the positions illustrated in FIG. 8. In this position, the transversely extending floor supporting rods 328 and 332 are extended across the cage of the coop assembly 62 in a position to pass over or clear the elongated supporting rods 272 when they are pushed into position. Two of the elongated supporting rods 272 are then pushed into position beneath the floor supporting rods 328 and 332 to support these rods and the floor panels 390 and 392 in their horizontally extending positions.

At this time, of course, the tension on the control cables 322 and 324 can be relaxed by unwinding the cable 448 from the wench drum 444. In this status, the inner side edges of the floor panels 390 and 392 are sufficiently closely adjacent to each other that chickens cannot fall downwardly between these floor panels to the lowermost tier. The floor panels 390 and 392 are thus positioned to constitute the second tier in the coop assembly 62. It will be noted that at this time, the curved pivot plates 394 and 396 carried at the outer side edges of the two floor panels 390 and 392 are hooked over and pivotally engaged with the lowermost rod 398 in the corresponding lattice 401.

With the floor panels 390 and 392 in place, the worker on the coop assembly 62 then directs chickens discharged from the elongated telescoping conveyor 46 onto this second tier in the coop assembly 62 until this level has been loaded with chickens. After this, the third tier is positioned for receiving chickens by sliding the floor panels 414 and 416 into position and supporting them upon the transversely extending floor supporting rods 346 and 348. This is effected by the use of the winch subassembly 440 in the manner hereinbefore described. Thus, the hooks 450 and 452 carried by the cable 448 of the winch subassembly 440 are engaged with the loops 352, and the pairs of control cables 338 and 340 are pulled upwardly until the rod receiving plates 342 and 344 are in a proper position to support the floor panels 414 and 416 on the transversely extending floor supporting rods 346 and 348. After this, the elongated supporting rods 272 are pushed into position in the manner illustrated in dashed lines in FIG. 8 to pass beneath the transversely extending floor supporting rods 346 and 348 and thus provide firm support for the floor panels 414 and 416 when they are in their horizontally extending, aligned positions. Chickens can now be placed on this third tier of the coop assembly 62.

In placing the fourth and uppermost tier in position, substantially the same procedure is followed of inserting the floor panels 424 and 426 through the opposite sides of the coop assembly to a horizontally extending, aligned position where they are supported by the transversely extending floor supporting rods 364 and 366, and by the inserted elongated supporting rods 272. The uppermost tier of the coop assembly 62 is then filled with chickens.

Finally, the top panels 370 and 372 are reinserted in their closing positions as shown in FIG. 10 of the drawings. It may be pointed out that in the insertion of the various floor panels and the top panels to their chicken-supporting and coop closing positions, the arcuate or curved pivot plates carried on the outer side edges of the floor panels can be used as handles, and also that handles 474 and 476, functioning solely as such, are also provided on each of the top panels 470 and 472. It should also be pointed out that the winch subassembly 440 is removable from the top of the coop assembly 62 by simply lifting upwardly the winch subassembly, including the rectangularly configured subplate 442 forming a part thereof, and swinging it away from the coop assembly. In use, the winch subassembly 440 is simply rested in its operative position and retained against canting or swinging movement by the abutting contact of its end sides against the upwardly extending flanges of the elongated angle members 464 and 466 which extend across opposite sides of the top of the coop assembly 62.

By loading the coop assembly 62 while it is in position on a truck of the type illustrated in FIGS. 1 and 12 of the drawings, the coop assembly is positioned to automatically discharge chickens, in cooperation with the conveyor subassembly 284 carried on the truck 480, directly to a conveyor at a processing plant.

When the truck 480 has reached the locus of the processing plant, the chickens are unloaded from the coop assembly 62 in consecutive sequence from the several tiers thereof. Initially the discharge flaps 374 and 476 are released from their chicken-supporting positions by extracting the discharge flap support rod 378. This rod is pulled outwardly from the apertures or holes formed in the horizontally extending bottom frame members 254 at opposite sides of the coop assembly, and the discharge flaps 374 and 376 can fall or pivot downwardly to the position illustrated in FIG. 11. At this time, a workman standing at one side of the coop assembly 62 (such as that side shown in FIG. 9) can use an elongated prod carrying a soft mop or the like at one end thereof to push the chickens standing on the floor plates 380 and 382 toward the center of the coop assembly where they can move downwardly through the opening provided by the opened discharge flaps 374 and 376, and come to rest upon the conveyor subassembly 484 carried on the truck 480. The prod employed by the workman can be extended into the tier of chickens by reason of the pivotal mounting of the trapezoidally configured gate plate 406 located in the center of the lowermost of the lattices 401. As chickens come to rest upon the endless belt of the conveyor subassembly 484, they are moved to the rear of the truck 480 and are deposited upon a receiving conveyor (not shown) at the processing plant. From thence they are carried to a processing location within the plant where they are decapitated, plucked and prepared for the market.

After the chickens from the bottom tier constituted by the floor plates 380 and 382 and discharge flaps 374 and 376 have been removed, the winch subassembly 440 is placed in position by resting the rectangularly configured subplate 442 upon the stand plate 456. The workman, standing upon the top panel 470 can then operate the handle 446 of the winch subassembly 440 to permit the hooks 450 and 452 to be engaged with the loops 336 formed at the upper end of the pairs of control cables 322 and 324. After the hooks 450 and 452 of the winch subassembly 440 are thus engaged, and the control cables 322 and 324 are placed slightly in tension, the elongated supporting rods 272 are pulled outwardly to release the transversely extending floor supporting rods 328 and 330.

The winch subassembly 440 is then actuated to permit the cable 448 and the hooks 450 and 452 carried at opposite ends thereof to be gradually extended so as to lower the rod receiving plates 326 and 330 and, with them, the transversely extending floor supporting rods 328 and 332. This has the effect of permitting the floor panels 390 and 392 to pivot downwardly to the position shown in FIG. 11 as the floor supporting rods 328 and 332 move downwardly to the lower end of the downwardly and outwardly extending tracks 298 and 300. At this time, the chickens which have been standing upon the second tier constituted by the removable floor panels 390 and 392 slide down these panels, aided, if necessary, by the use of a prod extended through the trapezoidally configured gate plate 406, so that the chickens from this tier are also discharged through the central opening into the bounded passageway constituted by the discharge flaps 374 and 376. The chickens from the second tier are thus deposited upon the endless belt of the conveyor subassembly 284 and are moved into the processing plant as hereinbefore described.

After the chickens have been removed from the second tier, the process of engaging the hooks 450 and 452 of the winch subassembly 440 with the loops 352 at the upper ends of the pairs of control cables 338 and 340 is repeated, the elongated supporting rods 372 are removed, and the rod receiving plates 342 and 344 are lowered, along with the transversely extending floor supporting rods 346 and 348. This action permits the floor panels 414 and 416 to be pivoted downwardly to the position shown in FIG. 11. In undergoing such pivotal movement, the floor panels 414 and 416 are able to pivot about the axis of the rod 398 which is engaged by the arcuate or curved pivot plates 418 and 420 disposed at the outer side edges of each of these floor panels.

After the chickens have been removed from the third tier of the coop assembly 62, the process of dropping the floor panels 424 and 426 constituting the top tier is repeated in the same manner as that which has been described as characteristic of the manner of lowering the floor panels beneath this top tier. Thus, ultimately, all of the chickens within the coop assembly 62 are discharged through the space provided at the center of the lower side of the coop assembly, and pass onto the endless belt of the conveyor subassembly 484 for ultimate removal to the processing plate.

From the foregoing description of the system of the present invention, it will be perceived that a highly useful concept is advanced for the semi-automatic harvesting, cooping and transporting of chickens, with the system being advantageously characterized in permitting the chickens to be discharged directly to a conveyor of a processing plant with very little jostling or rough handling encountered in the course of harvesting, loading or unloading of the fowl. Although various structural characteristics of preferred embodiments have been herein described in detail, it will be understood that various changes and innovations in the structures illustrated and described can be made without departure from the basic principles of the invention. Changes and innovations of this type are therefore deemed to be within the spirit and scope of the invention except as the same may be necessarily limited by the appended claims or reasonable equivalents thereof.

What is claimed is:

1. A system for harvesting and transporting chickens comprising:
    a self-propelled vehicle having finger-carrying chicken harvesting means at one side thereof for picking up and elevating chickens as the vehicle advances;
    a first conveyor carried on said self-propelled vehicle for receiving chickens from said chicken harvesting means and moving them to a second side of said vehicle;
    an elongated telescoping conveyor having first and second ends, and having said first end pivotally connected to said vehicle and positioned under one end of said first conveyor at said second side of said vehicle for receiving chickens discharged from said first conveyor;
    swingable boom means pivotally mounted on said vehicle for pivotation about a vertical axis and including a flexible suspension member connected to a medial portion of said elongated telescoping conveyor for swingably supporting said telescoping conveyor from said vehicle; and
    a coop assembly detachably connected to the second end of said telescoping conveyor.

2. A system as defined in claim 1 and further characterized as including a steering wheel subassembly pivotally secured to, and depending from, said telescoping conveyor for guiding the movements of said telescoping conveyor.

3. A system as defined in claim 2 wherein said elongated telescoping conveyor comprises:
    a first section carrying said first end;
    a second section slidably and telescopingly engaging said first section and carrying said second end;
    a plurality of rollers carried on said first section;

a plurality of rollers carried on said second section; and an endless flexible belt extending around and over said rollers of both of said sections in a path to remain under substantially constant tension during telescoping movement of said sections relative to each other.

4. A system as defined in claim 1 wherein said elongated telescoping conveyor comprises:
 a first section carrying said first end;
 a second section slidably and telescopingly engaging said first section and carrying said second end;
 a plurality of rollers carried on said first section;
 a plurality of rollers carried on said second section; and
 an endless flexible belt extending around and over said rollers of both of said sections in a path to remain under substantially constant tension during telescoping movement of said sections relative to each other.

5. A system as defined in claim 1 and further characterized as including a discharge chute subassembly connected to the second end of the telescoping conveyor for receiving chickens from the telescoping conveyor, said discharge chute subassembly comprising:
 a cover plate projecting outwardly from the second end of said telescoping conveyor; and
 a plurality of downwardly depending flexible flaps secured to said cover plate and forming a chute.

6. A system as defined in claim 1 wherein said coop assembly comprises:
 a right parallelepiped cage;
 a plurality of pairs of horizontally aligned floor panels pivotally mounted in said cage and forming a plurality of vertically spaced tiers, each of said floor panels being pivotable about a horizontal axis at one side of said cage; and
 a pair of cooperating discharge flaps at the bottom of said cage and pivotally mounted on the cage for pivotation from a first position of coplanar alignment in which the discharge flaps close and open in the center of the bottom of the cage, to a second position in which the discharge flaps hang downwardly from the cage.

7. A system as defined in claim 6 wherein said coop assembly further comprises floor control system means mounted on said cage for selectively pivoting said floor panels downwardly to displace chickens on said tiers to the bottom of said cage.

8. A system for harvesting and transporting chickens comprising:
 a self-propelled vehicle having finger-carrying chicken harvesting means at one side thereof for picking up and elevating chickens as the vehicle advances;
 a first conveyor carried on said self-propelled vehicle for receiving chickens from said chicken harvesting means and moving them to a second side of said vehicle;
 an elongated telescoping conveyor having first and second ends, and having said first end connected to said vehicle and positioned under one end of said first conveyor at said second side of said vehicle for receiving chickens discharged from said first conveyor;
 swingable boom means pivotally mounted on said vehicle and including a flexible suspension member connected to a medial portion of said elongated telescoping conveyor for swingably supporting said telescoping conveyor on said vehicle;
 a coop connector subassembly connected to the second end of said telescoping conveyor and comprising:
  a connector frame pivotally connected to said telescoping conveyor adjacent the second end thereof;
  a connector pin projecting downwardly from said connector frame;
  a tubular sleeve rotatably engaging said connector pin; and
  a flanged plate secured to said connector sleeve; and
 a coop assembly detachably engaged at an upper side thereof to said flanged plate of said coop connector subassembly.

9. A system as defined in claim 8 wherein said coop assembly comprises:
 a right parallelepiped cage;
 a plurality of pairs of horizontally aligned floor panels pivotally mounted in said cage and forming a plurality of vertically spaced tiers, each of said floor panels being pivotable about a horizontal axis at one side of said cage; and
 a pair of cooperating discharge flaps at the bottom of said cage and pivotally mounted on the cage for pivotation from a first position of coplanar alignment in which the discharge flaps close and open in the center of the bottom of the cage, to a second position in which the discharge flaps hang downwardly from the cage.

10. A system as defined in claim 9 wherein said coop assembly further comprises floor control system means mounted on said cage for selectively pivoting said floor panels downwardly to displace chickens on said tiers to the bottom of said cage.

11. A system as defined in claim 10 wherein said coop assembly is further characterized as including a pair of substantially parallel, horizontally entending angle members secured across the upper side of said cage, one of said angle members engaging said flanged plate to retain said second end of said conveyor over said coop assembly.

12. A system for harvesting and transporting chickens comprising:
 a self-propelled vehicle having finger-carrying chicken harvesting means at one side thereof for picking up and elevating chickens as the vehicle advances;
 a first conveyor carried on said self-propelled vehicle for receiving chickens from said chicken harvesting means and moving them to a second side of said vehicle;
 an elongated telescoping conveyor having first and second ends, and having said first end connected to said vehicle and positioned under one end of said first conveyor at said second side of said vehicle for receiving chickens discharged from said first conveyor;
 swingable boom means pivotally mounted on said vehicle and including a flexible suspension member connected to a medial portion of said elongated telescoping conveyor for swingably supporting said telescoping conveyor on said vehicle;
 a coop assembly detachably connected to the second end of said telescoping conveyor; and a steering wheel subassembly pivotally secured to, and depending from, said telescoping conveyor for guiding the movements of said telescoping conveyor, said steering wheel subassembly comprising:
   a pair of convergent angle members having their divergent ends pivotally connected to the underside of said telescoping conveyor for pivotation about horizontal axes, and depending downwardly therefrom;
   a wheel frame supporting block carried at the lower, convergent ends of said convergent angle members;
   a wheel frame pivotally connected to said supporting block for pivotation about a vertical axis and including:
   a pivot block;
   a pivot pin pivotally connecting said pivot block to said supporting block for pivotation about a vertical axis;
   a pair of spaced wheel supporting plates connected to said pivot block;
   a guide wheel rotatably mounted between said wheel supporting plates; and
   a steering handle connected to said pivot block.

13. A system for harvesting and transporting chickens comprising:
   a self-propelled vehicle having finger-carrying chicken harvesting means at one side thereof for picking up and elevating chickens as the vehicle advances;
   a first conveyor carried on said self-propelled vehicle for receiving chickens from said chicken harvesting means and moving them to a second side of said vehicle;
   an elongated telescoping conveyor having first and second ends, and having said first end connected to said vehicle and positioned under one end of said first conveyor at said second side of said vehicle for receiving chickens discharged from said first conveyor, said elongated telescoping conveyor comprising:
   a first section carrying said first end, said first section comprising:
      a pair of spaced, elongated, parallel channel members of C-shaped cross-sectional configuration; and
      a slide block connected to each of said channel members;
   a second section slidably and telescopingly engaging said first section and carrying said second end, said second section comprising:
      a pair of spaced, elongated, parallel channel members of C-shaped cross-sectional configuration, each of said parallel channel members of the second section slidably receiving and guiding one of said slide blocks therein; and
      a pair of additional slide blocks in said telescoping conveyor, each of said parallel channel members in said second section having one of said additional slide blocks connected thereto, and each of said channel members in said first section slidably receiving one of said additional slide blocks;
   a plurality of rollers carried on said first section;
   a plurality of rollers carried on said second section; and
   an endless flexible belt extending around and over said rollers of both of said sections in a path to remain under substantially constant tension during telescoping movement of said sections relative to each other;
   swingable boom means pivotally mounted on said vehicle and including a flexible suspension member connected to a medial portion of said elongated telescoping conveyor for swingably supporting said telescoping conveyor on said vehicle; and
   a coop assembly detachably connected to the second end of said telescoping conveyor.

14. A system for harvesting and transporting chickens comprising:
   a self-propelled vehicle having finger-carrying chicken harvesting means at one side thereof for picking up and elevating chickens as the vehicle advances;
   a first conveyor carried on said self-propelled vehicle for receiving chickens from said chicken harvesting means and moving them to a second side of said vehicle;
   an elongated telescoping conveyor having first and second ends, and having said first end connected to said vehicle and positioned under one end of said first conveyor at said second side of said vehicle for receiving chickens discharged from said first conveyor;
   swingable boom means pivotally mounted on said vehicle and including a flexible suspension member connected to a medial portion of said elongated telescoping conveyor for swingably supporting said telescoping conveyor on said vehicle;
   a coop connector subassembly connected to the second end of said telescoping conveyor and comprising:
      a connector frame pivotally connected to said telescoping conveyor adjacent the second end thereof;
      a connector pin projecting downwardly from said connector frame;
      a tubular sleeve rotatably engaging said connector pin; and
      a flanged plate secured to said tubular sleeve;
   a coop assembly detachably connected at its upper side to said flanged plate; and
   a steering wheel subassembly pivotally secured to, and depending from, said telescoping conveyor for guiding the movements of said telescoping conveyor.

15. A system as defined in claim 14 and further characterized as including a discharge chute subassembly connected to the second end of the telescoping conveyor for receiving chickens from the telescoping conveyor, said discharge chute subassembly comprising:
   a cover plate projecting outwardly from the second end of said telescoping conveyor; and
   a plurality of downwardly depending flexible flaps secured to said cover plate and forming a chute.

16. A system for harvesting and transporting chickens comprising:
   a self-propelled vehicle having finger-carrying chicken harvesting means at one side thereof for picking up and elevating chickens as the vehicle advances;
   a first conveyor carried on said self-propelled vehicle for receiving chickens from said chicken harvesting means and moving them to a second side of said vehicle;
   an elongated telescoping conveyor having first and second ends, and having said first end pivotally connected to said vehicle and positioned under one end of said first conveyor at said second side of said vehicle for receiving chickens discharged from said first conveyor;

swingable boom means pivotally mounted on said vehicle for pivotation about a vertical axis and including a flexible suspension member connected to a medial portion of said elongated telescoping conveyor for swingably supporting said telescopiing conveyor on said vehicle, and for selectively elevating the second end of said telescoping conveyor;

a coop assembly detachably connected to the second end of said telescoping conveyor and comprising:

a right parallelepiped cage positioned under the second end of said conveyor and detachably connected at the upper side thereof to said telescoping conveyor;

a plurality of pairs of horizontally aligned floor panels pivotally mounted in said cage and forming a plurality of vertically spaced tiers, each of said floor panels extending substantially half the distance across said cage and being pivotable about a horizontal axis at one side of said cage, and each of said floor panels being slidably movable into and out of said cage through the sides thereof; and a pair of cooperating discharge flaps at the bottom of said cage and pivotally mounted on the cage for pivotation from a first position of coplanar alignment in which the discharge flaps close and open in the center of the bottom of the cage, to a second position in which the discharge flaps hang downwardly from the cage.

17. A system for harvesting and transporting chickens comprising:

a self-propelled vehicle having finger-carrying chicken harvesting means at one side thereof for picking up and elevating chickens as the vehicle advances;

a first conveyor carried on said self-propelled vehicle for receiving chickens from said chicken harvesting means and moving them to a second side of said vehicle;

an elongated telescoping conveyor having first and second ends, and having said first end pivotally connected to said vehicle and positioned under one end of said first conveyor at said second side of said vehicle for receiving chickens discharged from said first conveyor;

swingable boom means pivotally mounted on said vehicle for pivotation about a vertical axis and including a flexible suspension member connected to a medial portion of said elongated telescoping conveyor for swingably supporting said telescoping conveyor from said vehicle; and a steering wheel subassembly pivotally secured to, and depending from, said telescoping conveyor for guiding the movements of said telescoping conveyor, said steering wheel subassembly comprising:

elongated supporting means for supporting wheel frame means below said telescoping conveyor, and having an upper end pivotally connected to the underside of said telescoping conveyor intermediate the length thereof for pivotation about a horizontal axis;

a guide wheel rotatably mounted on the lower end of said wheel supporting means for rotation about a vertical axis; and a steering handle operatively connected to said guide wheel for swivelling said guide wheel about said vertical axis to permit said telescoping conveyor to be swung upon said swingable boom means to a preselected position for discharging chickens from the second end of said telescoping conveyor.

* * * * *

UNITED STATES PATENT OFFICE
CERTIFICATE OF CORRECTION

Patent No. 4,037,565          Dated July 26, 1977

Inventor(s) Lloy W. Ledwell, Jr.

It is certified that error appears in the above-identified patent and that said Letters Patent are hereby corrected as shown below:

Column 5, line 39, change "belts" to --belt-- ;

Column 7, line 31, change "dischared" to --discharged-- ;

Column 8, line 18, change "of" first occurrence to -- or --;

Column 8, line 23, change "potions" to --portions-- ;

Column 9, line 8, change "coneyor" to --conveyor-- ;

Column 9, line 23, before "run" insert --upper-- ;

Column 11, line 11, change "thereform" to --therefrom-- ;

Column 13, line 19, change "terminated" to --terminate-- ;

Column 13, line 21, after "chickens" insert --are-- ;

Column 15, line 26, change "riser" to --risers-- ;

Column 16, line 11, change "positon" to --position-- .

Signed and Sealed this

Twenty-fifth Day of October 1977

[SEAL]

Attest:

RUTH C. MASON
Attesting Officer

LUTRELLE F. PARKER
Acting Commissioner of Patents and Trademarks